United States Patent [19]

Kahrs et al.

[11] Patent Number: 5,509,383
[45] Date of Patent: Apr. 23, 1996

[54] HYDRAULIC UNIT

[75] Inventors: Manfred Kahrs, Wiesbaden; Gerhard Kunz, Linden; Franz Fleck, Langenscheid; Hans-Gebhard Krines, Usingen; Walter Peterknecht, Wehrheim; Winfried Huthmacher, Frankfurt/am Main, all of Germany

[73] Assignee: ITT Automotive Europe GmbH, Germany

[21] Appl. No.: 107,730

[22] PCT Filed: Feb. 18, 1992

[86] PCT No.: PCT/EP92/00337

§ 371 Date: Nov. 29, 1993

§ 102(e) Date: Nov. 29, 1993

[87] PCT Pub. No.: WO92/14641

PCT Pub. Date: Sep. 3, 1992

[30] Foreign Application Priority Data

Feb. 20, 1991 [DE] Germany .......................... 41 05 144.0
Jun. 22, 1991 [DE] Germany .......................... 41 20 664.9
Aug. 19, 1991 [DE] Germany .......................... 41 27 327.3

[51] Int. Cl.⁶ .................................................. F01L 1/34
[52] U.S. Cl. .................... 123/90.12; 123/90.17; 123/90.31; 464/2; 74/568 R
[58] Field of Search ............... 123/90.12, 90.13, 123/90.15, 90.17, 90.31, 90.33; 464/1, 2, 160; 74/568 R, 567

[56] References Cited

U.S. PATENT DOCUMENTS

| | | | |
|---|---|---|---|
| 4,188,925 | 2/1980 | Jordan | 123/90.12 |
| 4,896,633 | 1/1990 | Junghans et al. | 123/90.12 |
| 4,928,641 | 5/1990 | Niizato et al. | 123/90.33 |
| 5,046,460 | 9/1991 | Buttefield et al. | 123/90.17 |
| 5,058,539 | 10/1991 | Saito et al. | 123/90.17 |
| 5,138,985 | 8/1992 | Szodfridt et al. | 123/90.17 |
| 5,184,578 | 2/1993 | Quinn, Jr. et al. | 123/90.17 |
| 5,311,846 | 5/1994 | Mueller | 123/90.17 |

FOREIGN PATENT DOCUMENTS

| | | |
|---|---|---|
| 0317372 | 5/1989 | European Pat. Off. . |
| 0406527 | 1/1991 | European Pat. Off. . |
| 2378659 | 8/1978 | France . |
| 2456007 | 12/1980 | France . |
| 8806109 | 9/1989 | Germany . |
| 4033105 | 4/1992 | Germany . |

OTHER PUBLICATIONS

PCT Search Report (German language).

*Primary Examiner*—Weilun Lo
*Attorney, Agent, or Firm*—Dykema Gossett

[57] ABSTRACT

A hydraulic system with a hydraulic pump driven directly by an internal-combustion engine reduces the dimension, weight and number of component parts used in the state of the art systems while optimizing energy exploitation. A plurality of elements, one of which is a cam shaft adjusting device, are supplied with hydraulic pressure fluid by one and the same pump. A series of simplified hydraulic connections enables equivalent devices to be driven simultaneously by one or more pump circuits.

3 Claims, 9 Drawing Sheets

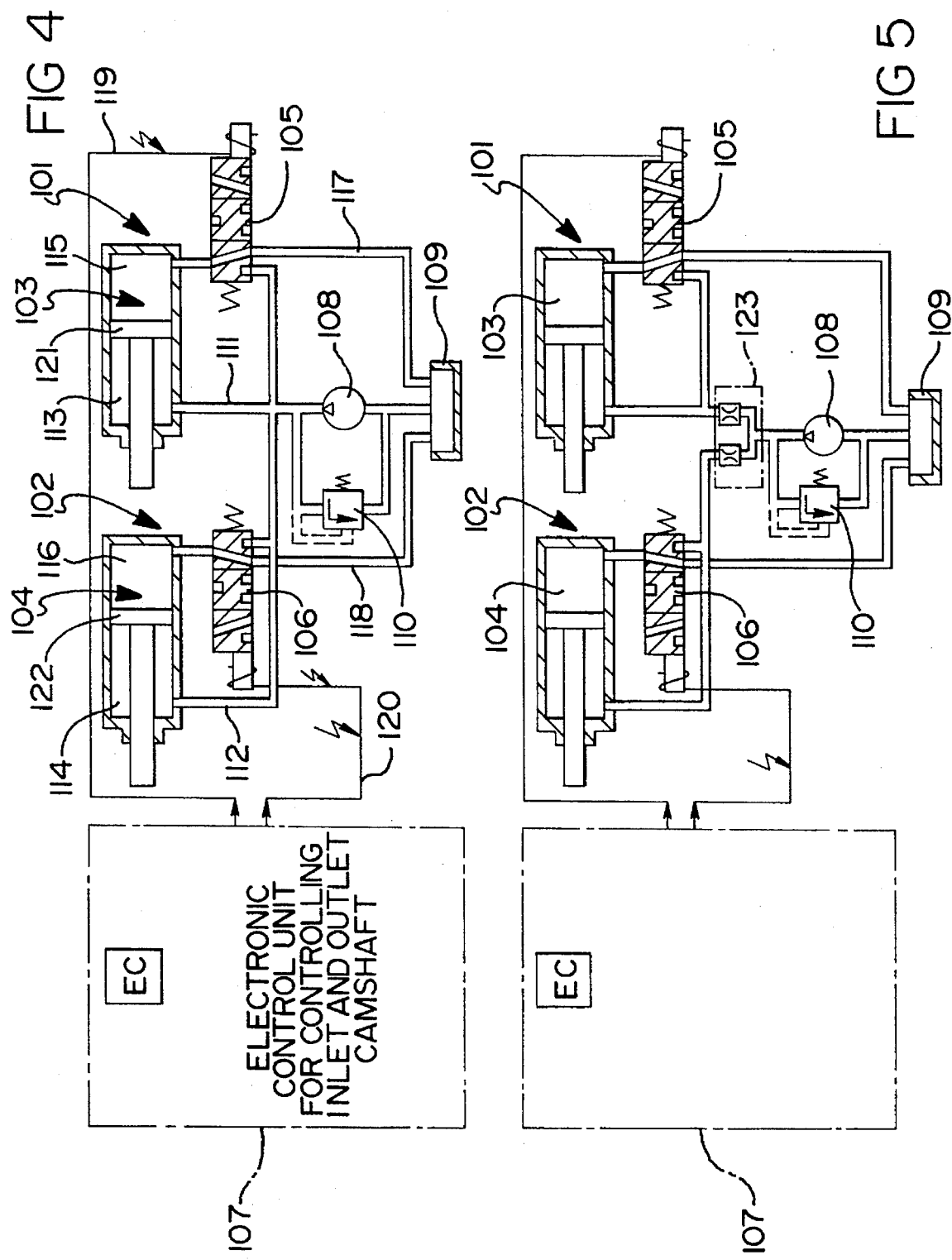

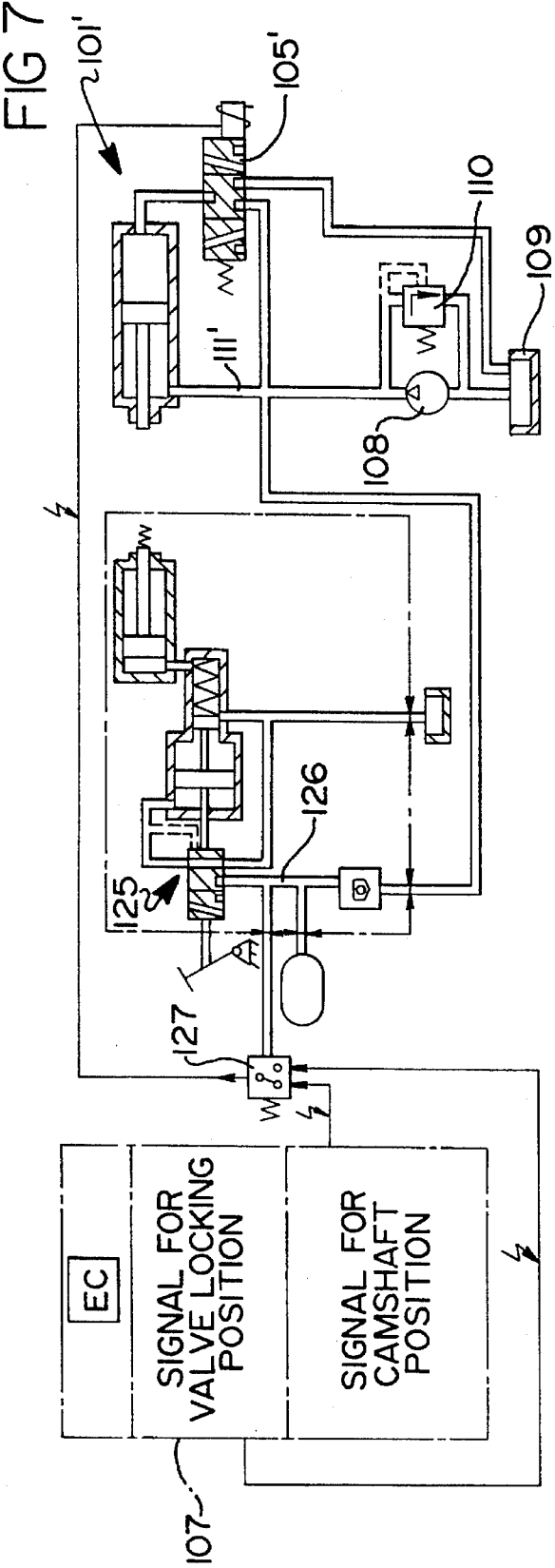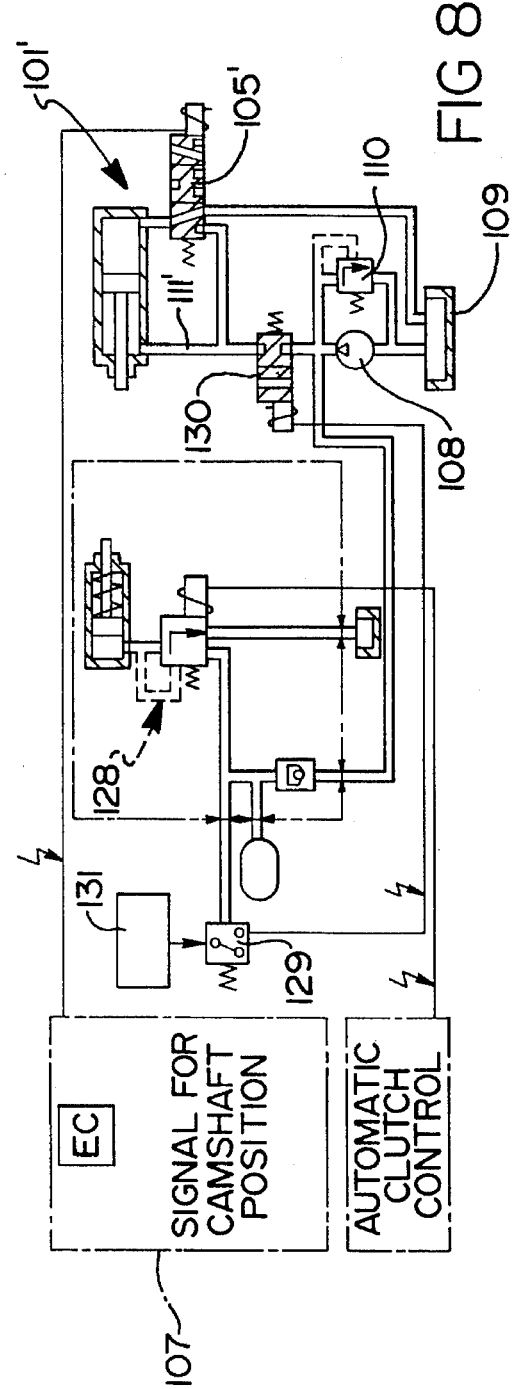

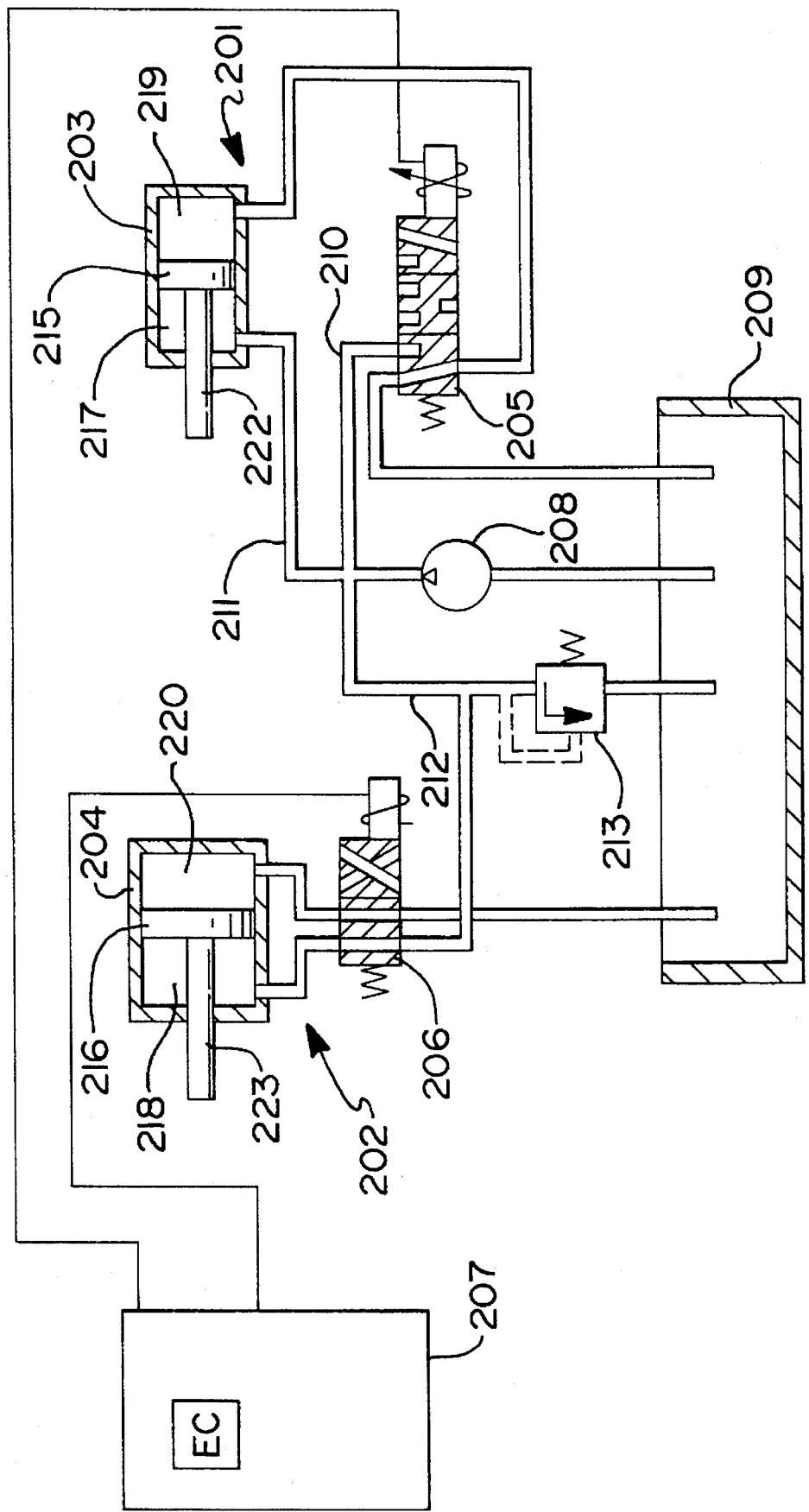

5,509,383

HYDRAULIC UNIT

BACKGROUND OF THE INVENTION

The invention generally relates to a hydraulic system with a hydraulic pump which is directly driven by an internal-combustion engine and more particularly to a hydraulic system with a hydraulic pump whose delivery rate is controlled at the inlet or at the outlet.

SUMMARY OF THE INVENTION

A hydraulic unit of this kind is described in German Patent Application No. 4,033,105. The operating fluid (hydraulic pressure fluid) of the pump, respectively of the combination of pumps, may be constituted by the lubricating agent of the internal-combustion engine, but alternatively a separate hydraulic pressure fluid circuit may be envisaged as well. If however, in an automotive vehicle for which a hydraulic system of this kind is provided, a plurality of hydraulic consumers exist and each consumer is supplied with hydraulic pressure fluid independently of all others, considerable constructional efforts, enormous space requirements and elevated costs are required.

It is, therefore, the object of the invention to further develop a hydraulic system of the kind under review in such a way that considerable reduction in cost, space requirements, weight and energy consumption are achieved.

This object is attained by utilizing the pump, which has as up to now exclusively been utilized for the variable adjustment of the camshafts, for other consumers so that their pumps may be dropped and, as a consequence, costs and space saved.

In this conjunction, both hydraulic devices may serve for the adjustment of camshafts, one camshaft adjusting device driven by each of the devices. In this context, in the case of engines with cylinders not being arranged in series (for example, V-shaped arrangement), the two camshafts can each actuate a series of inlet valves. It is another possibility that one of the two camshafts actuates exclusively inlet valves, whereas the other one actuates outlet valves.

According to another advantageous development, the second device serves a consumer which has to be supplied with hydraulic pressure fluid with priority, because it is of importance for safety reasons. This consumer may be the hydraulic operating cylinder of a hydraulic power steering system, a chassis control device, a booster of an automatic clutch or a brake system.

In particular, when an application requires that devices be equally or equivalently supplied with hydraulic pressure fluid, then solenoid valves provide a priority switching means such that, in a certain contingency, at least one of the two devices is actuated even in the event of a reduced pump capacity.

A very simple design connection giving precedence to a consumer of importance for safety reasons is an unlockable non-return valve, subject to pressure in the second device, interposed between the first device and the pump.

A very simple design connection for operating two hydraulically equivalent devices is a flow divider valve. In this instance both devices are supplied with hydraulic pressure fluid by a single pump circuit equivalently, without influencing each other. The hydraulic pressure fluid is delivered according to the demand of the devices by the flow divider valve. In particular, this type of connection is well-suited when both devices serve separate camshafts, each cam shaft exclusively controlling their respective outlet valves, or inlet valves. Another simple design connection preferable in the case of identical devices, in particular in devices actuating two camshafts, utilizes a proportional valve connected to the first device and a two position valve connected to the second device. Such an arrangement of connections is expedient if and when one device inlet camshaft and a second device outlet camshaft is to be adjusted, since for the optimization of the combustion within the engine the inlet camshaft has to be adjusted at finer steps than the outlet camshaft. In order to make sure that the other device (outlet valves) which is connected through the two-position valve is not influenced by the momentary function of the driving device (inlet valves) connected through the proportional valve, the overall system is designed such that in the former device a lower pressure exists than in the latter system. This is achieved in a simple manner by selecting a correspondingly larger cross-section of the hydraulic operating piston in the low-pressure device that is to say, in the device which actuates the outlet valves.

In accordance with the further developments it is recommended that the two-position valve is a three-way two-position valve and that the piston for the adjustment of the camshaft controlling the outlet valves is prestressed in the retracting direction of the piston by means of a spring.

In the hydraulic system in which the second device is a consumer which is of importance for safety reasons, the combinations of features shown in FIGS. 7 and 8 are recommended, along the lines of a further development of the inventive thought. In this design the effect of a priority switching means is also imitated in a simple way.

Another method to avoid a priority switching means is provided by the combination of features shown in FIGS. 1–10. Such pumps work largely without loss, above all when they are controlled on the suction side. The pump may be configured optionally as a multiple-piston pump with only one single piston star, which allows a plurality of pistons to be grouped and connected together to form one pump circuit or to be furnished with a plurality of piston stars which are driven by a common driving shaft. An advantage offered by such a design is that, at but slight extra cost, the individual devices can be supplied with hydraulic pressure fluid largely without reciprocal reactions. To this end, a plurality of, for example, identical or equivalent devices are associated with each pump circuit. A further improvement as to excluding reciprocal reactions results from the application of the features as per the disclosed device. It is true that in this embodiment, in which with each consumer is associated with a pump circuit of its own, the disadvantage of a slightly excessive delivery rate at certain times in certain circuits might creep up, but any safety risk whatsoever caused by a reciprocal reaction of the individual devices is avoided. As an alternative, it can be imagined that one pump circuit is comprised of a plurality of consumers which may also be preferably connected in parallel. The devices should preferably be equivalent to each other. In this configuration, the application of a priority switching means is envisaged for the consumer which is of importance for safety reasons.

A particularly silent operation of the hydraulic unit results when the pump is integrated into the cylinder head since the large mass of the engine damps the vibrations of the pump.

When the pump is driven indirectly—for example by gear wheels and/or by a chain and/or by a toothed belt—or directly by the camshaft or, else, by the crankshaft, the energy losses will be further reduced.

The device of FIGS. 11 and 12 offers the advantage that the hydraulic system is supplied with freshly delivered and, thus, also filtered lubricating agent as operating fluid, without the functionally determined pressure fluctuations in the lubricating circuit of the internal-combustion engine being transmitted to the suction behavior of the pump of the hydraulic system. The intermediate reservoir can be disposed in a favorable location inside or outside the internal-combustion engine and, therefore, many possibilities are presented to the design engineer for the positioning and the drive of the hydraulic pump. The constructional requirements for the storage and for the return of a separate operating fluid are dropped. The inventive hydraulic unit will be particularly advantageous if and when it serves for the actuation of controlling members inside the internal-combustion engine, for example for the control of the engine, because in that case the operating fluid can be conveyed back to the lubricating agent sump through the reflux ducts of the internal-combustion engine which are provided for the lubricating agent.

As shown in FIG. 11 a restrictor orifice may be envisaged in the connecting line going from the lubricating circuit to the intermediate reservoir in order to limit to the necessary volume the quantity of operating fluid which is fed to the intermediate reservoir.

Since the intermediate reservoir remains pressureless, the inventive hydraulic system offers, furthermore, the opportunity to control the delivery rate of the hydraulic pump by throttling the suction rate. Such control is highly advantageous where the system is driven by an internal-combustion engine in order to limit virtually without losses the delivery rate of the hydraulic pump at more elevated rates of revolutions of the engine.

The embodiment affords a simple-design set-up of the hydraulic system and a simple-design configuration of the hydraulic pump, as any leakages occurring at the latter will can be conveyed directly into the interior space of the internal-combustion engine, as a result whereof any particular sealing of the hydraulic pump can be foregone.

The embodiment in accordance with FIG. 12 is distinguished above all by minimized constructional efforts, since a tight seal on one side of the pump housing is dropped. Thanks to the arrangement of the orifice disc, an aspiration of air through the piston slot is, moreover, avoided, so that an air-free delivery of the operating fluid and, consequently, a reduction of the noise of the pump are ensured. The adulteration of the operating fluid, too, will be reduced to a considerable extent by an air-free delivery.

A plurality of embodiments of the invention will be described in the following, making reference to the accompanying drawings.

BRIEF DESCRIPTION OF THE DRAWINGS

FIG. 4 is a schematic representation of an inventive hydraulic system with two devices for camshaft adjustment each one provided with an electromagnetic valve, the priority being controlled electronically.

FIG. 5 is a schematic representation of another inventive hydraulic system with two devices for camshaft adjustment and with a hydraulic flow divider valve.

FIG. 7 is a schematic representation of an inventive hydraulic system with a device for camshaft adjustment and a hydraulic clutch booster, with a pressure switch providing a signal for the blocking of the hydraulic pressure fluid supply of the camshaft adjusting device to the latter's control valve.

FIG. 8 is a schematic representation of an inventive hydraulic system with a device for camshaft adjustment and an automatic clutch, with a pressure switch opening a normally closed 2/2-way valve which is inserted in the connection between the camshaft adjusting device and the pump.

FIG. 9 is a schematic representation of two equivalent devices, in particular camshaft adjusting devices, which are connected to one pump circuit.

DETAILED DESCRIPTION OF A PREFERRED EMBODIMENT

Figure 1:
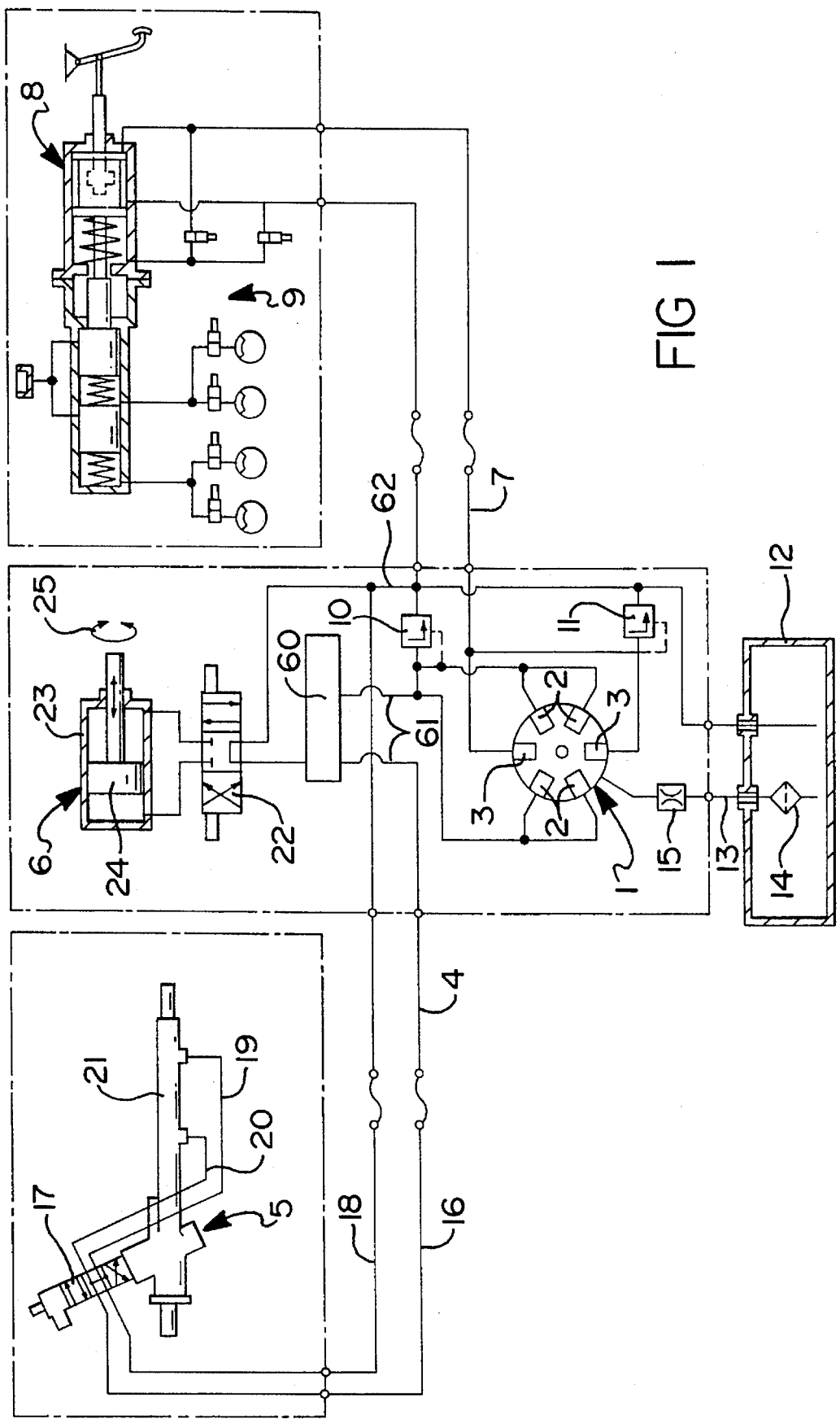
FIG. 1 is a schematic representation showing an inventive hydraulic system with a pump for a camshaft adjusting device, a hydraulic power steering system and a brake system with anti-locking device and with a hydraulic booster.

In FIG. 1, a star of a radial piston pump 1 with six pistons 2, 3 is shown in a diagrammatic representation. The four pistons 2 are grouped together to form one pump circuit 4 which supplies hydraulic pressure fluid to hydraulic power steering system 5 and, through a priority switching means 60, to camshaft adjusting device 6 which is connected in parallel. The two pistons 3 are grouped together to form the pump circuit 7 which supplies hydraulic pressure fluid to hydraulic booster 8 of hydraulic brake unit 9.

In each pump circuit 4, 7 a pressure-limiting valve 10, 11 is inserted which, initiated by a preset pressure, opens up in the direction of the pressure-less reservoir 12. Out of said reservoir 12 the pump 1 aspirates the hydraulic pressure fluid. In the suction line 13, a filter 14 and a restrictor 15 are positioned, the latter limiting the maximum suction rate.

The hydraulic brake system 9, with its booster 8, is not explained in more detail in this instance since such systems, in particular also those provided with anti-locking device, are general state of the art and a detailed functional description in conjunction with the present invention can, thus, be foregone.

From the pump circuit 4, a line 16 leads directly from the pump 1 to a 4/3-way valve 17 of the hydraulic power steering system 5. The latter is, thus, the priority consumer of this pump circuit 4. In the illustrated position of the valve 17, an open connection exists between the line 16 and the line 62 which leads into the reservoir 12. In this way, the operating cylinder 21 can be supplied by the pump 1 with hydraulic pressure fluid.

Furthermore, a connection leads from the pump circuit 4 over a line 61 and a priority switching means 60 to the 4/3-way proportional valve 22 to the camshaft adjusting device 6. By switching-over the valve 17, the right or the left side of the operating cylinder, that is to say, the line 19, respectively 20 is optionally subjected to the pump pressure over the line 16. The other side of the operating cylinder 21 will then be connected to the reservoir 12.

The 4/3-way proportional valve 22 controls the hydraulic pressure within the operating cylinder 23 of the camshaft adjusting device 6. In the illustrated central position of the valve, no direct connection exists between the lines 61 and 62, so that the operating cylinder 23 is cut off from the pump pressure. In this position, the operating cylinder 23 is hydraulically locked. In each one of the other two valve positions of the valve 22, the piston 24 is unilaterally pressurized and will slide accordingly. Simultaneously, a camshaft is rotated by a determined angle through toothing elements which are not shown in the drawing. This rotation is outlined by the arrow 25.

The priority switching means 60 is provided in order always to be able to supply the operating cylinder 21 of the power steering system with priority to sufficient pressure from the pump 1. The element 60, which is not explained in more detail, ensures that on the actuation of the power steering system 5, no pressurized fluid can flow to the camshaft adjusting device 6.

Figure 2:
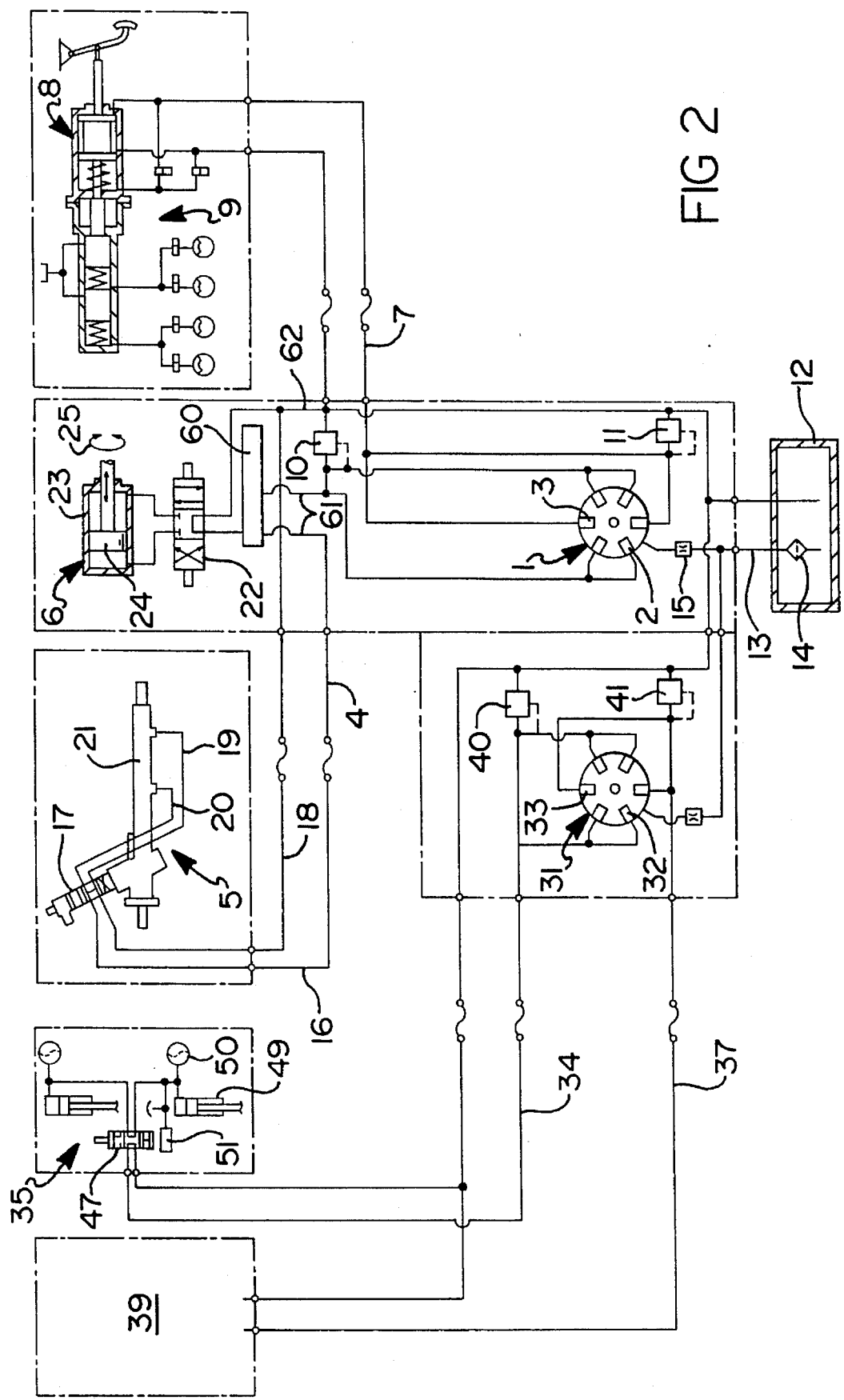
FIG. 2 is a schematic representation of a system which is additionally provided with a second pump piston star as well as with a level control device and with a further consumer.

In all figures, constructional units are outlined by dash-dotted lines. In FIG. 2, in addition to the components described above, a second pump piston star 31 with pistons 32, 33 is shown, both pumps 1, 31 being driven by the same shaft.

As in the pump 1, also in the case of the pump 31, the pistons 32, respectively 33 are grouped together to form one pump circuit 34, respectively 37. In said circuits 34 and 37, pressure-limiting valves 40 and 41 are provided which are capable of discharging hydraulic pressure fluid in the direction of the reservoir 12. A device for level control 35 is supplied with hydraulic pressure fluid by the pump circuit 34. Pump circuit 34 is controlled by a 4/3-way valve 47. Furthermore, two shock absorbers 49, two accumulators 50 and one brake power controller 51 are outlined. The circuit 37 supplies a further device 39 with hydraulic pressure fluid. This could, for example, be a clutch booster.

Figure 3:
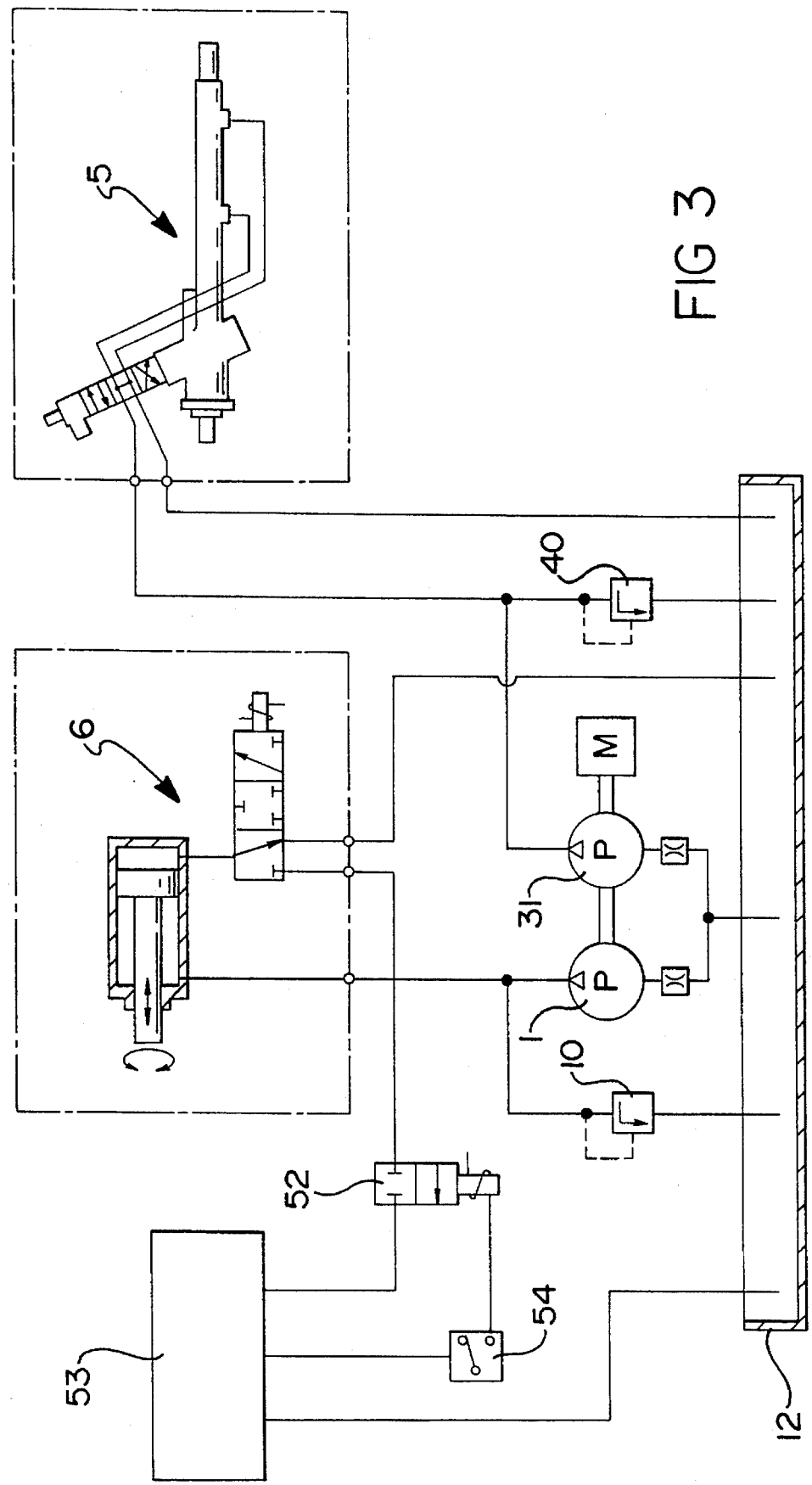
FIG. 3 is a schematic representation of a system in which the camshaft adjusting device and the power steering system are each connected to one pump circuit.

In FIG. 3, again a double pump with two piston stars 1, 31 is shown, one pump 31 supplying the hydraulic power steering system 5 with hydraulic pressure fluid. The pump 1 supplies primarily the camshaft adjusting device 6 and secondarily, through the 2/2-way valve 52, a differential pawl 53 which is equipped with a slip control. By a priority switching means, being outlined in the shape of a switch 54, it is safeguarded that in case of need, said differential pawl 53 will be pressurized.

Figure 6:
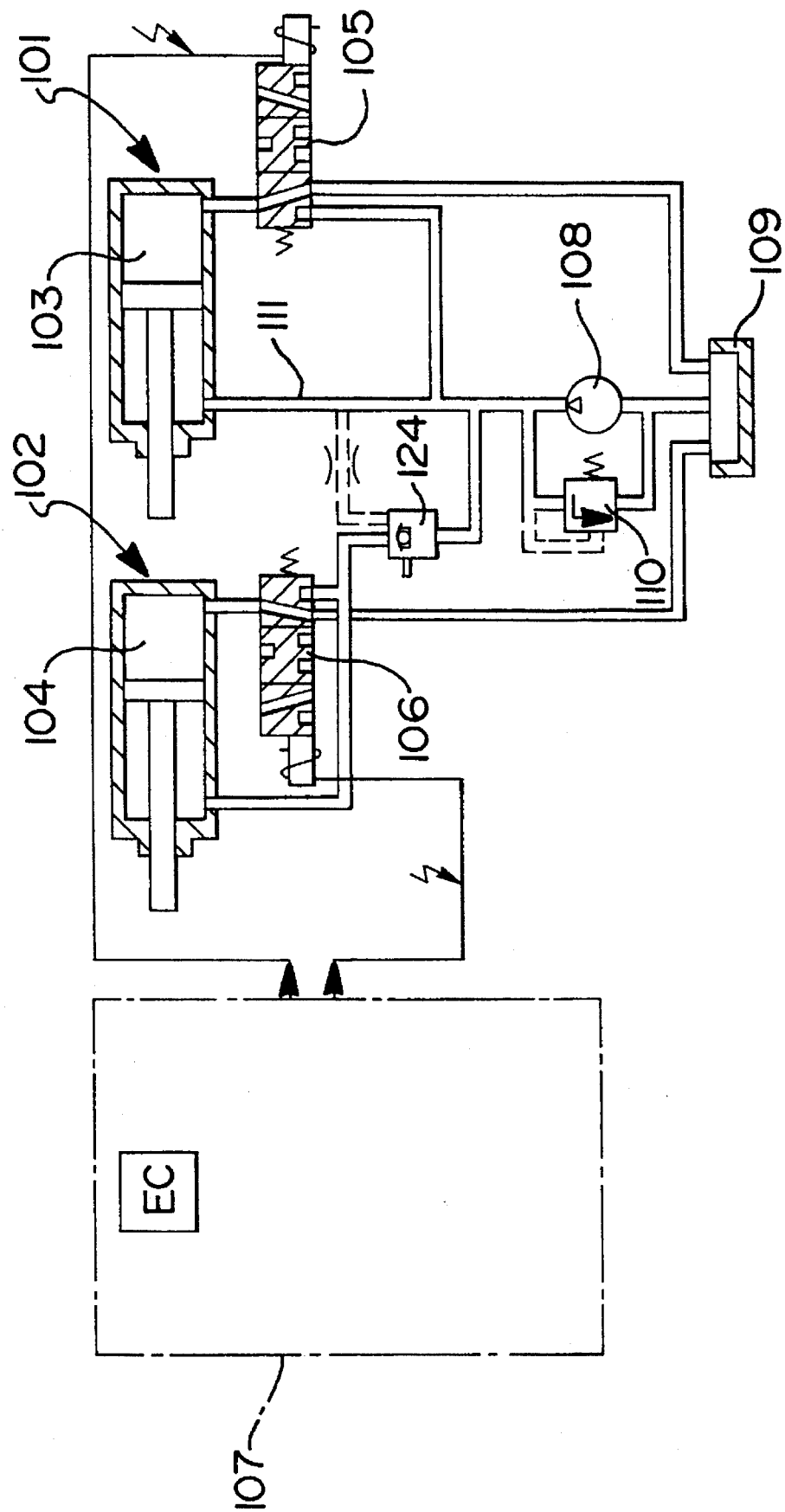
FIG. 6 is a schematic representation of a further inventive hydraulic system with two devices for camshaft adjustment and with an unlockable non-return valve.

In each of the FIGS. 4 to 6, one device 101 for the adjustment of an inlet camshaft and one device 102 for the adjustment of an outlet camshaft are shown. Each device 101, 102 consists of a double-acting hydraulic cylinder 103, 104 and of an electronically actuatable proportional solenoid valve 105, 106 with three potential positions. Said solenoid valves 105, 106 are controlled by a common electronic control unit 107. The latter may be a component part of the extended electronic engine management.

For the supply of hydraulic pressure fluid, a hydraulic pump 108 is envisaged in all embodiments which aspirates hydraulic pressure fluid out of a pressureless reservoir 109. Said reservoir 109 serves simultaneously for collecting the hydraulic pressure fluid flowing back from the various consumers (103, 104, 125, 128). Parallel to said pump 108, a pressure-limiting valve 110 in each instance opens up in the direction of the reservoir 109.

In the embodiment shown in FIG. 4, hydraulic lines 111, 112 lead directly from the pump 108 into the lefthand power chamber 113, 114 of the cylinders 103, 104 as viewed in the drawing. In the de-energized positions of the solenoid valves 105, 106 as shown in the drawing, the righthand power chambers 115, 116 are connected through the hydraulic lines 117, 118 to the reservoir 109. When the valves 105, 106 are actuated over the electric lines 119, 120, the righthand power chambers 115, 116 can be shut off, from or connected to the pump 108.

By stipulating the priority of the two consumers in the electronic control unit 107, delivery of pressure fluid to the lower priority device can be interrupted ensuring that sufficient pressure fluid can be delivered to the priority device when the pump delivery rate corresponds to the maximum consumption of one device 101, 102 only. In order to simultaneously or optionally adjust a determined position of both pistons 121, 122 within the cylinder 103, 104, either a permanent signal or a pulse width-modulated, respectively a pulse pause-modulated signal, is given to the solenoid valve 105, 106. For a priority-determined switching-off of, for example, the device 101, the valve must then not be supplied with electric current at all or care will have to be taken by means of an existing control circuit to ensure that the middle position of the valve is maintained. In lieu of the device 101, another consumer having importance under safety aspects may, of course, have its pressurized hydraulic fluid requirements ensured by an electronic control.

Most of the components in FIG. 5 do not differ from those in FIG. 4. Only the differences will, therefore, be discussed. In the embodiment of FIG. 5, no electronic priority control is provided. Downstream of the pump 108, a flow divider valve 123 is envisaged whereby both devices 101, 102 are being supplied equally with hydraulic pressure fluid. This solution is expedient above all for identical, equally important consumers. It has to be taken into account that the delivery rate of the pump 108 should correspond to the maximum consumption of both devices 101, 102 together. Nevertheless, this embodiment allows two equally important consumers to be supplied with hydraulic pressure fluid at especially low cost and in a particularly simple way.

In the embodiment shown in FIG. 6, the device 101 is being supplied with hydraulic pressure fluid priority, as it is directly connected to the pump 108. The second device 102 is connected to the pump 108 through a non-return valve 124 which is unlockable by the pressure in the line 111. In this design, the device 101 is supplied with priority with respect to hydraulic pressure fluid without electronic priority control so that in place of device 101 a consumer having importance for safety reasons could safely alternatively be envisaged.

In FIG. 7 beyond a device 101' for the adjustment of a camshaft as a consumer, a hydraulic clutch booster 125 is illustrated which will, however, not be dealt with in more detail. The latter constitutes a consumer being of importance for safety reasons. A pressure switch 127, actuated by the pressure available for hydraulic clutch booster 125 in line 126, signals to either solenoid valve 105', in the event of a sufficiently high pressure in the system, to allow fluid to camshaft adjusting device 101' or, in the event of too low a pressure to the clutch booster 125, a signal for the locking portion of solenoid valve 105'. A pressure switch 127 is actuated by the pressure available for hydraulic clutch signals to either the solenoid valve 105' booster 125 in line 126, in the event of a sufficiently high pressure in the system, to allow fluid to the camshaft adjusting device 101' or, in the event of too low a pressure to the clutch booster 125, a signal for the locking position of solenoid valve 105'. By this provision, a priority supply of hydraulic pressure fluid to the consumer having importance for safety reasons is ensured by electrohydraulic means dependent on the pressure.

In FIG. 8, an automatic clutch 128 is shown as the consumer having importance for safety reasons. The automatic clutch 128 is connected directly to the pump 108. System pressure acts on a pressure switch 129 which is capable of connecting to a voltage source 131 a 2/2-way valve 130, closed when de-energized, in the line 111 going to the device 101'. Also in this instance, hydraulic pressure fluid priority to the consumer having importance for safety reasons is ensured by the actuation of the automatic clutch depending on the system pressure.

In the embodiments according to FIG. 4 and according to FIGS. 6 to 8, hydraulic units are proposed by the invention which afford a multiple utilization of a hydraulic pump 108 if and when for safety reasons one consumer must be supplied with priority with respect to hydraulic pressure fluid. The variant as per FIG. 5 permits a simultaneous supply of two equivalent consumers. The advantages mentioned above which result from the utilization of the pump provided for the camshaft adjusting device apply in all cases.

FIG. 9 shows a device 201 for the adjustment of the inlet camshaft and a device 202 for the adjustment of the outlet camshaft. Each device 201, 202 is comprised of a double-acting hydraulic cylinder 203, 204 connected to an electrically actuatable solenoid valve 205, 206. The solenoid valves 205, 206 are controlled by a common electronic control unit 207. The latter may, for instance, be part of the extended electronic engine management.

The device 201 for the adjustment of the inlet camshaft is equipped with a proportional valve 205 and with a hydraulic cylinder 203 having a small cross-sectional area, and the device 202 for the adjustment of the outlet camshaft is furnished with a two-position solenoid valve 206 and with a hydraulic cylinder 204 having a large cross-sectional area which allows adjustment thereof at a lower pressure level than the device 201.

Both devices 201, 202 are supplied with hydraulic pressure fluid by a common hydraulic pump 208. Said pump 208 aspirates hydraulic pressure fluid from a pressureless reservoir 209 and conveys it through hydraulic lines 210, 211 and 212 to the proportional valve 205, to the hydraulic cylinder 203 and to the two-position valve 206 and from there to the hydraulic cylinder 204. Pressure-limiting valve 213 is connected to the line 212 and opens in the direction of the reservoir 209.

In the illustrated valve positions of the valves 205 and 206, the pistons 215 and 216 of the cylinders 203 and 204 move to the right in the drawing since each of the lefthand power chambers 217 and 218 are connected to the pump 208 and are pressurized and the righthand power chambers 219 and 220 are both connected to the reservoir 209 and are thus pressureless. When the two-position valve 206 is reversed, then the righthand power chamber 220 is pressurized and the lefthand power chamber 218 is connected to the reservoir 209, so that the piston 216 will slide to the left. Depending on the position of the two-position valve 206, the piston 216 will remain in its left or in its right final position. Depending on the position of the proportional valve 205, the piston 215 can be moved to any optional position. In the middle position of the valve 205, the piston 215 will remain immobile, since the righthand power chamber 219 is hydraulically locked. In the position of the valve 205 in which both power chambers 217 and 219 come to be connected to the pump 208, the piston 215 will move to the left, as the righthand piston surface is larger than the lefthand one.

Figure 10:
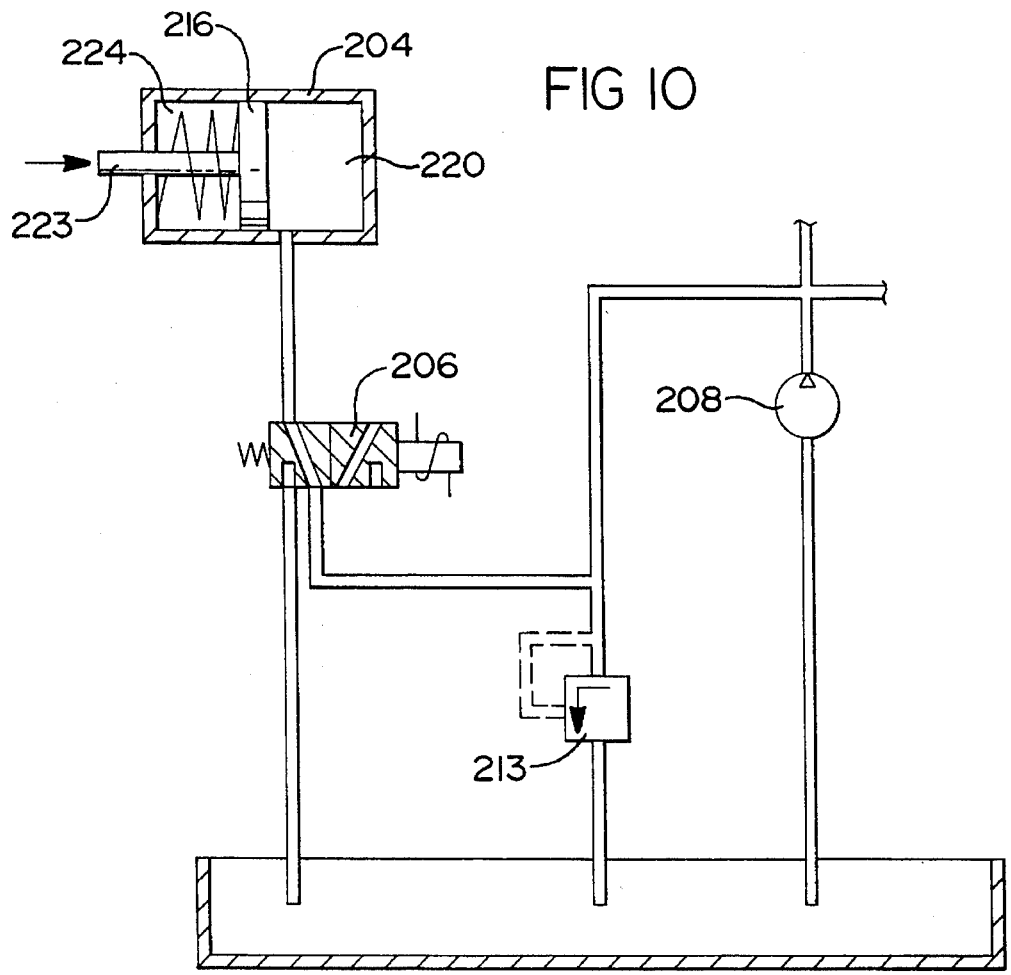
FIG. 10 is a schematic representation of a modified design version of the embodiment of FIG. 9 where the piston of the hydraulic device is prestressed in the retracting direction by means of a spring.

Whereas in FIG. 9 the piston rod 223 is capable of adjusting the outlet camshaft in both directions in accordance with the direction of motion of the piston 216, in FIG. 10 another possibility for the adjustment of the outlet camshaft by the piston 216 is illustrated FIG. 10 shows an extract of FIG. 9 which shows substantially the actuation of the outlet camshaft through the piston rod 223 by means of the piston 216. The assemblies shown in FIG. 10 will be explained only inasmuch as they have a method of operation which is different with respect to FIG. 9.

In FIG. 10, the second piston 216 has a preload directing it to the right side by means of a spring 224. The second piston 216 will, therefore, travel to the right as soon as the force exerted by said spring overcomes the force exerted by the pressure in the power chamber 220.

A simple-effect mode of operation results from such a configuration of the operating cylinder. In this design, for the retracting direction of motion, the force being exerted by the camshaft through the piston rod 223 is aided by spring 224.

A simplified configuration of the valve 206 will result from this measure insofar as by comparison with FIG. 9 two through openings for the passage of the control fluid can be eliminated. Beyond this, the comparison shows that by the arrangement in accordance with FIG. 10, a second connecting line between the cylinder 204 and the valve 206 can be foregone.

Figure 11:
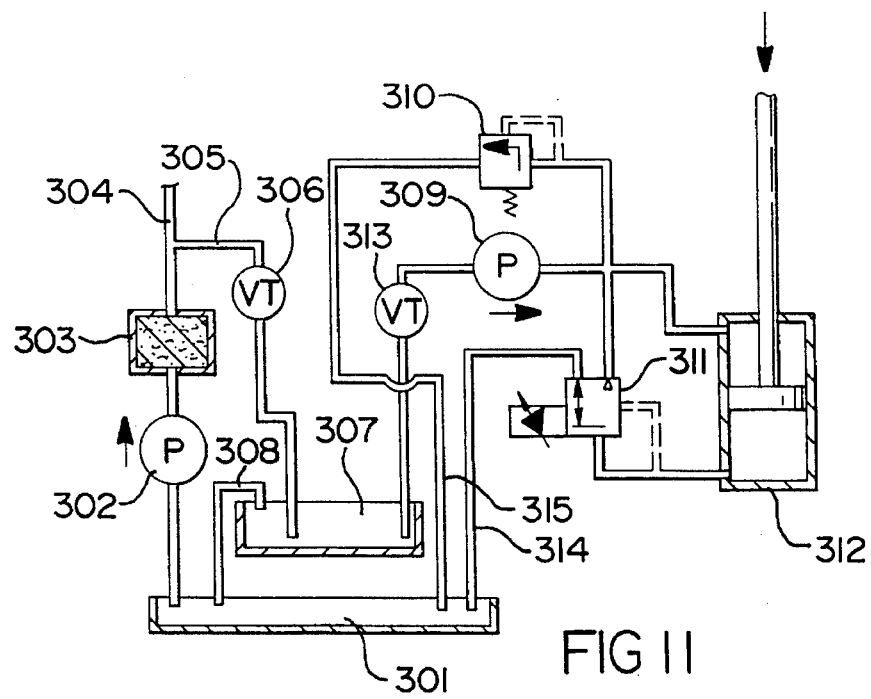
FIG. 11 is a schematic representation of an advantageous pump-side supply of an inventive hydraulic unit.

FIG. 11 shows a part of the lubricating circuit of an internal-combustion engine with a lubricant sump 301, a lubricating pressure pump 302, a filter 303, and a lubricating pressure line 304. From the lubricating pressure line 304, a delivery line 305 with a restrictor orifice 306 branches off terminating in an intermediate reservoir 307 with an overflow 308. Said intermediate reservoir 307 is part of a hydraulic unit which is comprised of a suction-controlled hydraulic pump 309, a pressure-limiting valve 310, an electromagnetically actuatable control valve 311, and an operating cylinder 312. The delivery line for the suction side of the hydraulic pump 309 is connected to the intermediate reservoir 307 through a restrictor orifice 313 for suction control. The delivery side of the hydraulic pump 309 is in direct connection with the piston rod side of the operating cylinder 312. For carrying out positioning movements, the piston rod-free side of the operating cylinder 312 is connected by the control valve 311 either to the delivery side of the hydraulic pump 309 or through a reflux line 314 to the lubricant sump 301. In the position of rest, the control valve 311 is locked and the piston of the operating cylinder 312 is maintained in the position it has reached at the particular moment. A reflux line 315 also leads to the lubricant sump 301 from the pressure-limiting valve 310.

The described hydraulic system can advantageously utilize the lubricating circuit of an internal-combustion engine to supply operating fluid to a hydraulic pump 309 driven by the internal-combustion engine, notwithstanding the considerable fluctuations of the operating pressure due to the rate of revolutions of the engine and the operating temperature.

The pressureless intermediate reservoir 307 provides suction pressure control of the hydraulic pump 309, so that the delivery rate of the hydraulic pump 309 can be limited to an adequate maximum value in a simple way and with minimum loss, regardless of strong fluctuations in the rate of revolutions of the pump drive.

Figure 12:
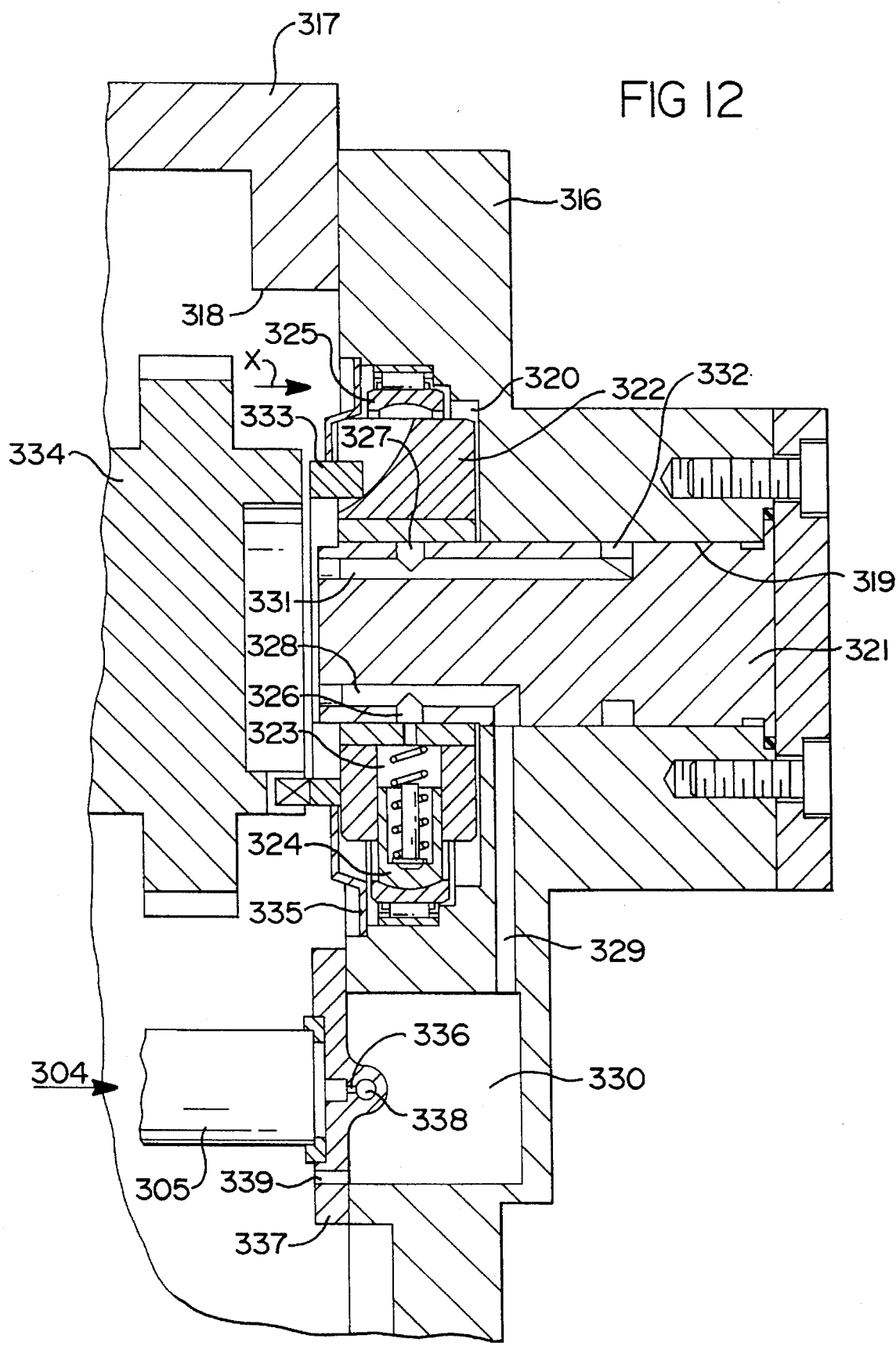
FIG. 12 is a sectioned representation of a radial piston pump flanged to an engine casing with integrated intermediate reservoir for use in a hydraulic system shown in FIGS. 1 to 11.

In FIG. 12 an embodiment of a hydraulic pump 309 is illustrated which is suited for the described hydraulic system. Hydraulic pump 309 is configured in the shape of a radial piston pump 309 and furnished with a substantially disc-shaped pump housing 316 flanged to the engine casing 317 of an internal-combustion engine and enclosing an opening 318 in the engine casing 317. Said pump housing 316 is formed with a longitudinal through bore 319 and a successive cylindrical recess 320. Within said longitudinal bore 319, a control pivot 321 is fixed, for example by pressing, and projects into said recess 320. A rotor 322 is pivoted on the control pivot 321 within said recess 320. In rotor 322, a plurality of radially-directed cylinder bores 323 are configured within which pistons 324 slide. Said pistons 324 are supported at their radially extended ends at the inner surface of a stroke ring 325 which is pivoted eccentrically with respect to the control pivot 321 within the recess 320 by means of a roller bearing. In the control pivot 321, control slots 326, 327 are configured in the plane of said cylinder bores 323 which in the event of a rotation of the rotor 322 come into connection one after the other with the individual cylinder bores 323 through radial connecting bores. The control slot 326 is located in the suction range of the pistons 324 and is connected to a suction duct 328 which runs in the longitudinal direction within the control pivot 321. Through an aspiration bore 329, said suction duct 328 is connected to an intermediate reservoir 330 which is formed as a chamber in the housing 316. The control slot 327 is located in the pressure range of the pistons 324 and is connected, through a pressure duct 331 in the control pivot 321 running parallel to the suction duct 328, to an annular groove 332 from which, outside the drawing plane, a bore leads to a pressure connection of the hydraulic pump.

The rotor 322 is driven, through a coupling 333, by a shaft 334, for example by the camshaft of the internal-combustion engine. The coupling 333 consists of a ring with axial wobblers. Radially outside the coupling 333, the recess 320 is enclosed by an orifice disc 335 being shaped of a thin metal sheet which is pressed into the recess 320 and is in abutment at a step surface of the recess 320. The orifice disc 335 encompasses the radially extended range of the rotor 322 and serves for the latter, as well as for the stroke ring 325, as a stop disc to limit motion in the axial direction. Leaking operating fluid which escapes at the pistons 324 and at the control pivot 321 is contained by orifice disc 335. As a result, the radially extended ends of the cylinder bores 323 are covered by operating fluid and air is prevented from aspirating through the piston slot when the suction pressure rises at the start of the suction pressure control. Excess operating fluid can flow off through the central bore for the coupling 333 into the engine casing 317.

The intermediate reservoir 330 is represented in a cross-section in the drawing and extends substantially vertically with respect to the drawing plane. The suction bore 329 terminates in the intermediate reservoir 330 near the bottom. Above the suction bore 329, operating fluid is fed to the intermediate reservoir 330 through the delivery line 305 which is branched off from the lubricating pressure line 304. Said delivery line 305 is in connection with the intermediate reservoir 330 through a restrictor orifice 336 which is provided in a cover lid 337 of said intermediate reservoir 330. By a transverse bore 338 the stream of operating fluid leaving the restrictor orifice 336 is deviated at an angle of 90 degrees toward the bottom of the intermediate reservoir 330. The volume of operating fluid supplied is limited in the intermediate reservoir 330 by the restrictor orifice 336. Above the restrictor orifice 336 and set off laterally with respect to the latter, an overflow bore 339 is provided in the cover lid 337 through which excess operating fluid can flow out of the intermediate reservoir 330 toward the interior space of the engine casing 317. The overflow bore 339 is disposed sufficiently high above the suction bore 329 that in any operating condition which may occur when the internal-combustion engine is mounted in a vehicle, such as braking, acceleration, driving through curves, shaking, inclined positions, the suction bore 329 will always remain covered with operating fluid. The restrictor orifice 336 is also positioned at a sufficient height so that the intermediate reservoir 330 will remain filled and cannot be drained over the delivery line 305 when the engine is switched off and the supply of lubricating pressure is interrupted.

The described hydraulic system and the hydraulic pump are suited above all for application in passenger cars and lorries as well as in automotive and in stationary machines. A preferred application is hydraulic adjusting devices for the control of the internal-combustion engine, for example for the adjustment of the camshaft.

We claim:

1. A hydraulic system comprising:
   a hydraulic pump driven by an internal combustion engine;
   a restrictor disposed on an intake side of the hydraulic pump wherein the restrictor limits a delivery rate of hydraulic pressure fluid to the pump;
   a first device supplied with hydraulic pressure fluid by said pump, wherein said first device is a variable cam shaft phase adjusting device for inlet valves,
   at least one second device supplied with hydraulic pressure fluid by said pump; wherein said second device is a variable cam shaft phase adjusting phase device for outlet valves,
   a proportional control valve fluidly connecting said first device with said pump,
   a two position valve fluidly connecting said second device with said pump,
   further wherein said second device connected to the pump through said two-position valve requires a lower driving pressure than the first device actuated by said proportional control valve.

2. The hydraulic system of claim 1 wherein said two-position valve is a three-way two-position valve.

3. The hydraulic system of claim 2, said device further comprising: a spring operatively connected to a piston for the adjustment of the camshaft controlling the outlet valves, the spring preloaded in a retracting direction of the piston.

* * * * *